US012275356B1

(12) United States Patent
Zhao

(10) Patent No.: US 12,275,356 B1
(45) Date of Patent: Apr. 15, 2025

(54) SUCTION MOUNT

(71) Applicant: Xiaohui Zhao, Dongguan (CN)

(72) Inventor: Xiaohui Zhao, Dongguan (CN)

( * ) Notice: Subject to any disclaimer, the term of this patent is extended or adjusted under 35 U.S.C. 154(b) by 0 days.

(21) Appl. No.: 18/884,154

(22) Filed: Sep. 13, 2024

(30) Foreign Application Priority Data

Aug. 6, 2024 (CN) .......................... 202421891433.6

(51) Int. Cl.
*B60R 11/00* (2006.01)
*B60R 11/02* (2006.01)

(52) U.S. Cl.
CPC ... *B60R 11/0241* (2013.01); *B60R 2011/0056* (2013.01); *B60R 2011/007* (2013.01); *B60R 2011/0089* (2013.01)

(58) Field of Classification Search
CPC ........... B60R 2011/007; B60R 11/0241; B60R 2011/0056; B60R 2011/0089; F16M 11/14; F16C 11/06
USPC ......... 248/205.8, 205.5–205.6, 205.9, 206.2; 269/21
See application file for complete search history.

(56) References Cited

U.S. PATENT DOCUMENTS

| | | | | |
|---|---|---|---|---|
| 5,065,973 A * | 11/1991 | Wang | ...................... | F16B 47/00 248/500 |
| 8,480,044 B2 * | 7/2013 | Liao | ...................... | F16M 11/14 269/95 |
| 8,740,161 B2 * | 6/2014 | Hsu | ...................... | F16M 11/14 248/205.8 |
| 10,261,543 B2 * | 4/2019 | Schachter | ............... | B60R 11/02 |
| 11,635,106 B1 * | 4/2023 | Song | ...................... | F16B 47/00 248/206.2 |
| 2018/0341289 A1 * | 11/2018 | Schachter | ............ | H04B 1/3877 |
| 2022/0357637 A1 * | 11/2022 | Park | ...................... | F16M 11/041 |
| 2024/0344656 A1 * | 10/2024 | Jakobuco | ............. | F16M 13/022 |
| 2024/0382020 A1 * | 11/2024 | Jakobuco | ............. | H01F 7/0252 |

* cited by examiner

*Primary Examiner* — Ingrid M Weinhold
(74) *Attorney, Agent, or Firm* — Bayramoglu Law Offices LLC

(57) ABSTRACT

A suction mount includes a magnetic assembly, a main body, and a suction cup. The magnetic assembly includes a magnet and is configured to magnetically fix a cellphone through the magnet. The main body is rotatably connected to the magnetic assembly. A universal ball head is provided between the main body and the magnetic assembly. The universal ball head is connected to the main body and the magnetic assembly, respectively. At least one of the main body and the magnetic assembly is rotatable relative to the universal ball head, such that the magnetic assembly rotates in any direction relative to the main body. The suction cup is located at a side of the main body facing away from the magnetic assembly. The suction cup is attached to an external support plane to form a closed chamber, and the suction cup is automatically adhered to the external support plane.

12 Claims, 8 Drawing Sheets

SUCTION MOUNT

CROSS REFERENCE TO THE RELATED APPLICATIONS

This application is based upon and claims priority to Chinese Patent Application No. 202421891433.6, filed on Aug. 6, 2024, the entire contents of which are incorporated herein by reference.

TECHNICAL FIELD

The present disclosure relates to the technical field of phone mounts, and in particular to a suction mount.

BACKGROUND

As a device for limiting the position of a cellphone, the phone mount is often used in cars. The cellphone is fixed on the phone mount by means of a magnet or clamping. The phone mount is usually fixed to the support plane through a suction cup, which improves the stability of phone placement and facilitates the user to use the cellphone.

However, in existing phone mounts, the magnetic assembly and the suction cup are relatively positioned. When the user presses the suction cup, the phone mount is fixed to the support plane through the suction cup and the angle between the suction cup and the magnetic assembly is not adjustable. To adjust the usage angle of the cellphone, it is necessary to move the phone mount as a whole, which makes the operation inconvenient. In addition, the suction operation of the suction cup is cumbersome.

SUMMARY

The present disclosure provides a suction mount, which solves the problems of inconvenient angle adjustment and cumbersome suction of the suction cup after the cellphone is fixed to the mount.

A suction mount includes:
- a magnetic assembly, including a magnet and configured to magnetically fix a cellphone through the magnet;
- a main body, rotatably connected to the magnetic assembly, where a universal ball head is provided between the main body and the magnetic assembly; the universal ball head is connected to the main body and the magnetic assembly, respectively; and at least one of the main body and the magnetic assembly is rotatable relative to the universal ball head, such that the magnetic assembly rotates in any direction relative to the main body;
- a suction cup, located at a side of the main body facing away from the magnetic assembly, where the suction cup is attached to an external support plane to form a closed chamber, and the suction cup is automatically adhered to the external support plane; and
- a control assembly, located in the mounting chamber and including a motherboard, a motor, and an exhaust element, where the motor is electrically connected to the motherboard; the exhaust element includes a piston and a cylinder; and the motor is configured to drive the piston to be pulled inside the cylinder so as to exhaust air in the closed chamber, such that the suction cup is adhered to the external support plane.

According to the above technical solution, an embodiment of the present disclosure has at least the following advantages and positive effects.

In the embodiment of the present disclosure, the suction mount includes a magnetic assembly, a main body, and a suction cup. The magnetic assembly includes a magnet and is configured to magnetically fix the cellphone through the magnet. The main body is rotatably connected to the magnetic assembly. A universal ball head is provided between the main body and the magnetic assembly, and the universal ball head is connected to the main body and the magnetic assembly, respectively. At least one of the main body and the magnetic assembly is rotatable relative to the universal ball head, such that the magnetic assembly rotates in any direction relative to the main body. The suction cup is located at a side of the main body facing away from the magnetic assembly. The suction cup is attached to an external support plane to form a closed chamber. The suction cup is automatically adhered to the external support plane due to the combined effect of a motor, a piston, and a cylinder. The magnetic assembly and the main body rotate through the universal ball head. Thus, after the suction cup is automatically adhered to the support plane and the cellphone is magnetically fixed to the magnetic assembly, the angle of the cellphone is adjustable in any direction.

BRIEF DESCRIPTION OF THE DRAWINGS

To describe the technical solutions in the embodiments or exemplary description of the present disclosure more clearly, the drawings required for the embodiments or exemplary description are briefly described below. The drawings in the following description show merely some embodiments of the present disclosure, and a person of ordinary skill in the art may still derive other drawings from these drawings without creative efforts.

REFERENCE NUMERALS

10. suction mount; 100. magnetic assembly; 200. main body; 300. suction cup; 400. universal ball head; and 500. control assembly; and

110. magnet; 120. support plate; 121. mounting hole; 122. stopper; 123. fixing element; 124. receiving groove; 130. cover plate; 210. spherical seat; 220. upper plate; 221. first circular portion; 222. fixing hole; 230. annular fastener; 231. second circular portion; 232. hook; 2321. inclined surface; 2322. clamping surface; 240. mounting chamber; 310. closed chamber; 410. ball; 420. connecting rod; 421. limit element; 510. motherboard; 511. air pressure detection element; 512. detection switch; 520. motor; 521. lever; 530. exhaust element; 531. piston; 5311. driving hole; 532. cylinder; 5321. pull cylinder; 5322. buffer cylinder; 5323. release hole; 5324. first one-way air valve; 5325. second one-way air valve; 540. release button; 541. pull bolt; 5411. first section; 5412. second section; 542. elastic element; 543. leather ring; 550. ventilation tube; 551. first tube; 552. second tube; and 553. third tube.

DETAILED DESCRIPTION OF THE EMBODIMENTS

The following clearly and completely describes the technical solutions in the embodiments of the present disclosure with reference to the drawings in the embodiments of the present disclosure. The described embodiments are merely a part, rather than all, of the embodiments of the present disclosure. All other embodiments obtained by those of ordinary skill in the art based on the embodiments of the present disclosure without creative efforts should fall within the protection scope of the present disclosure.

It should be noted that all the directional indications (such as upper, lower, left, right, front, and rear) in the embodiments of the present disclosure are merely used to explain relative position relationships or movement positions of the components in a specific orientation (as shown in the figures). If the specific orientation changes, the directional indication also changes accordingly.

Further, the technical solutions of the embodiments may be combined with each other on the basis that the combination is implementable by those of ordinary skill in the art. In case a combination of the technical solutions is contradictory or infeasible, such a combination is deemed not to fall within the protection scope of the present disclosure.

Figure 1:
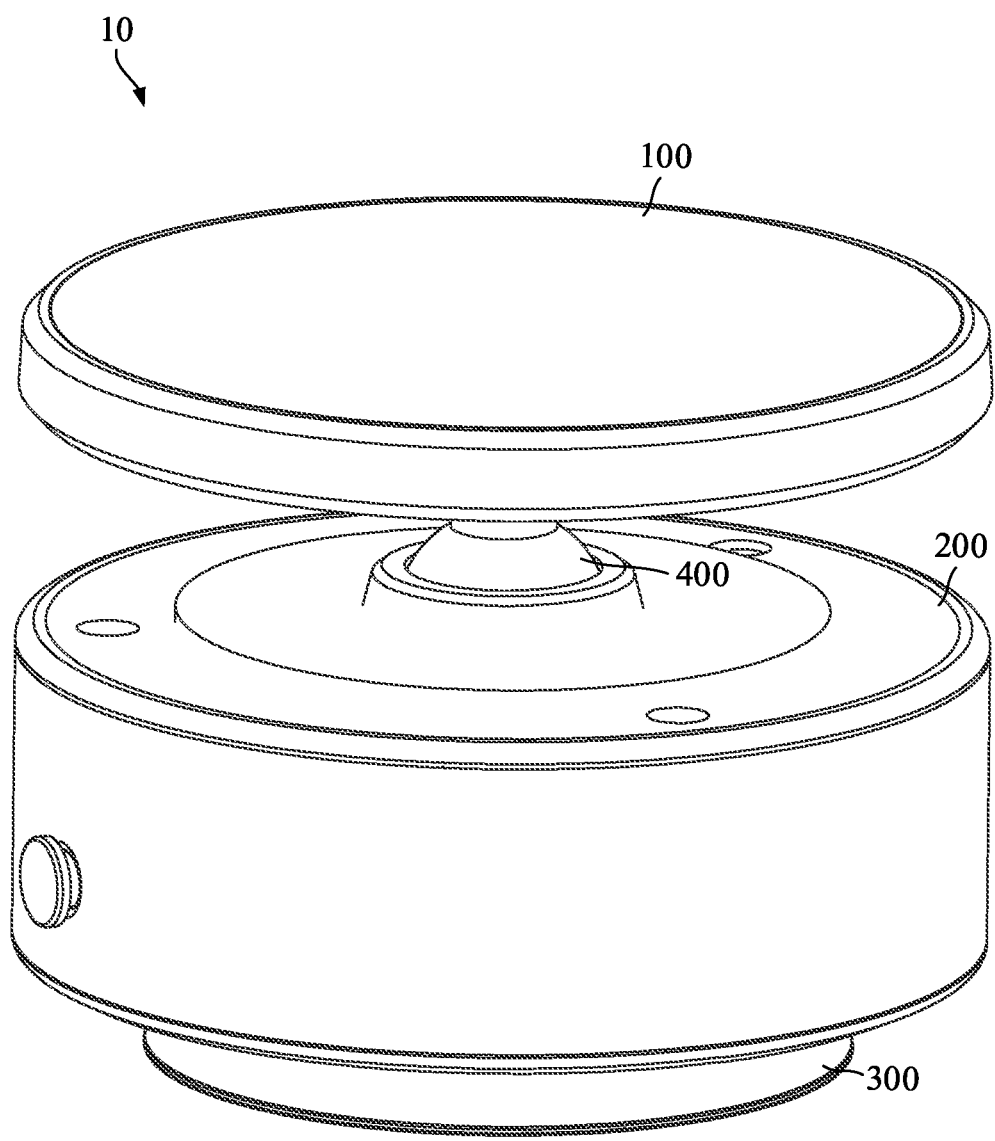
FIG. 1 is an overall structural diagram of a suction mount according to a first embodiment of the present disclosure.
Figure 2:
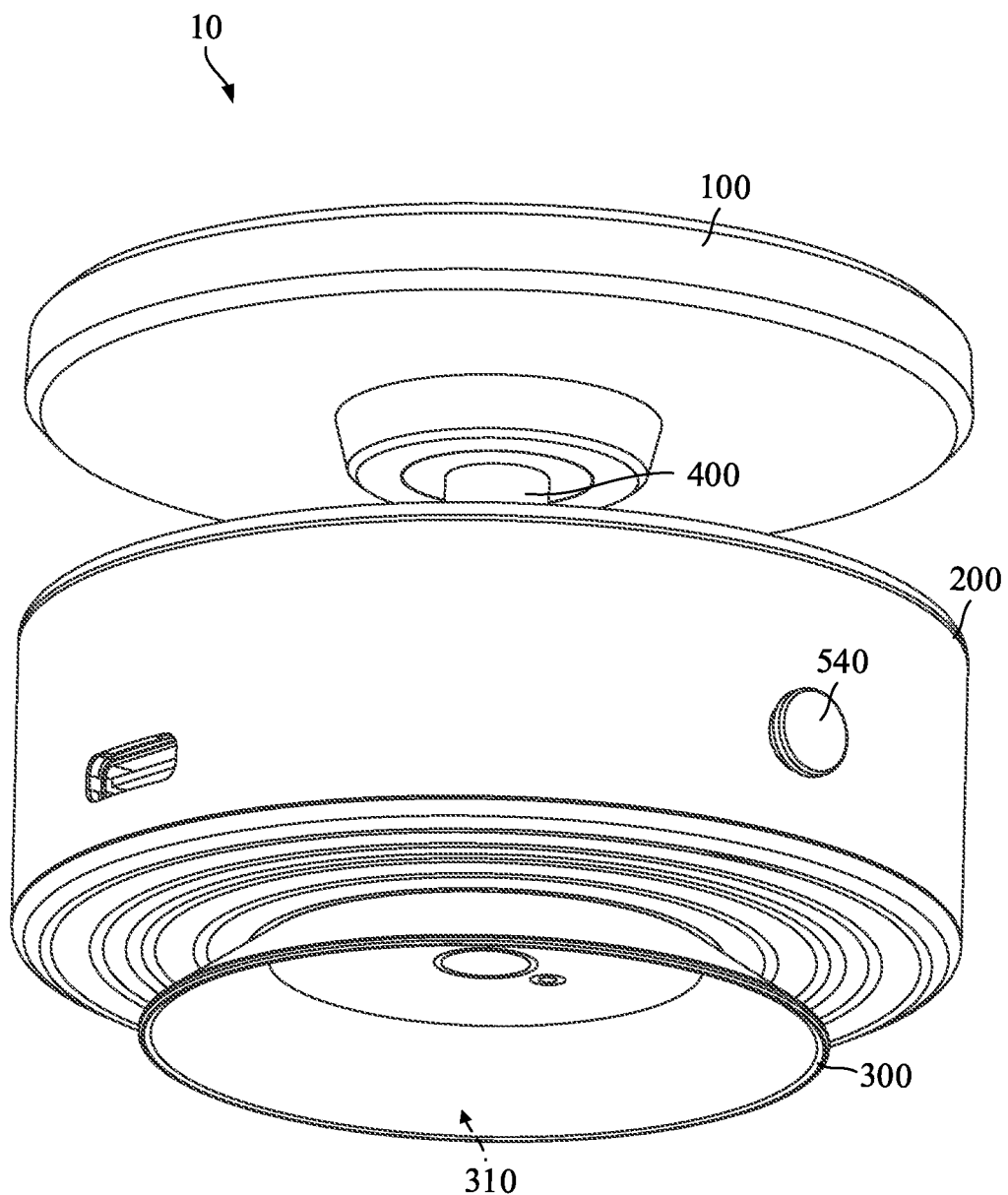
FIG. 2 is an overall structural diagram of the suction mount shown in FIG. 1 from another perspective.

As shown in FIGS. 1 and 2, the present disclosure provides suction mount 10. The suction mount 10 is configured to secure an electronic device such as a cellphone or a tablet. The suction mount 10 can be attached to a support plane such as a support stand in a car, making it convenient for the user to use the cellphone. The suction mount 10 includes magnetic assembly 100, main body 200, and suction cup 300. The magnetic assembly 100 is configured to magnetically fix the cellphone. The main body 200 is rotatably connected to the magnetic assembly 100. The suction mount 10 further includes universal ball head 400. The universal ball head 400 is provided between the main body 200 and the magnetic assembly 100. At least one of the main body 200 and the magnetic assembly 100 is rotatable relative to the universal ball head 400, such that the magnetic assembly 100 rotates in any direction relative to the main body 200. The suction cup 300 is located at a side of the main body 200 facing away from the magnetic assembly 100. The suction cup 300 is attached to the external support plane to form closed chamber 310, allowing the suction cup 300 to automatically adhere to the external support plane. After the suction cup 300 automatically attaches to the support plane and the cellphone is magnetically fixed to the magnetic assembly 100, the magnetic assembly 100 is rotatable relative to the main body 200 through the universal ball head 400, allowing the cellphone to adjust the angle in any direction, making it convenient for the user to use.

Figure 3:
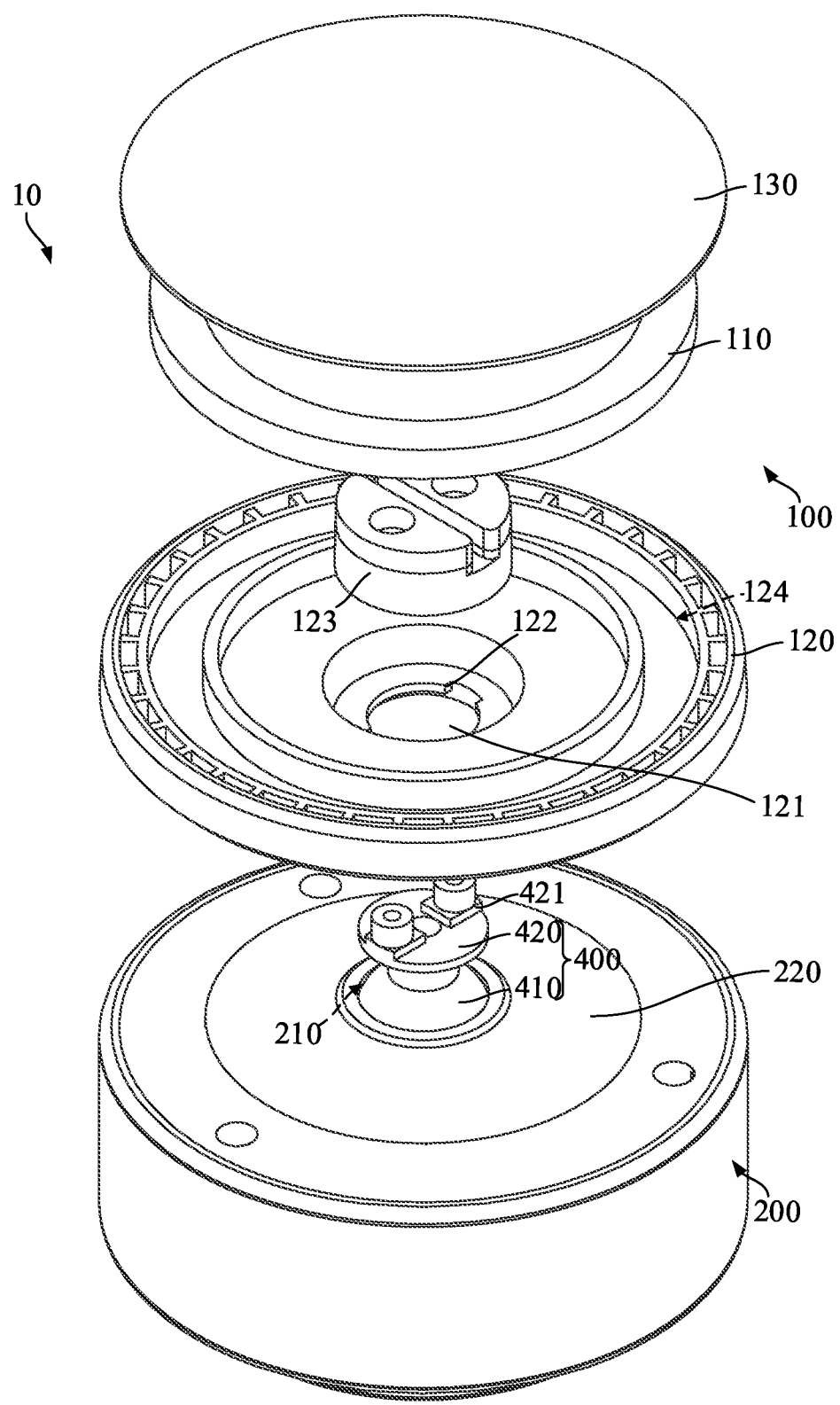
FIG. 3 is a first exploded view of the suction mount shown in FIG. 1.

As shown in FIG. 3, the magnetic assembly 100 includes magnet 110 and support plate 120. The support plate 120 is provided with receiving groove 124. The magnet 110 is accommodated in the receiving groove 124. The magnet 110 is configured to magnetically fix the cellphone to the support plate 120. The support plate 120 is configured to support the cellphone. The other side of the support plate 120 is connected to the universal ball head 400.

The magnetic assembly 100 further includes cover plate 130. The cover plate 130 is covered onto a side of the support plate 120 facing away from the main body 200. The closing method of the cover plate 130 can be snap fit, threaded connection, adhesive connection, etc. The cover plate 130 is closed onto the support plate 120 and seals the annular receiving groove 124 to prevent the magnet 110 from detaching from the receiving groove 124. A surface of the cover plate 130 can be made of an anti-slip material to prevent the cellphone from slipping off.

The support plate 120 is provided with mounting hole 121, a stopper 122, and an end of connecting rod 420 is inserted through the mounting hole 121 and fixedly connected to the support plate 120, thereby limiting the connecting rod 420 relative to the support plate 120. In this embodiment, the connection method between the connecting rod 420 and the support plate 120 is snap fit. The fixed connection method between the connecting rod 420 and the support plate 120 can also be another method, such as threaded connection and integrated connection. FIG. 3 also illustrates a fixing element 123 and a limit element 421.

In an embodiment, the universal ball head 400 includes ball 410 and the connecting rod 420. The ball 410 is fixedly connected to the connecting rod 420. For example, the ball 410 and the connecting rod 420 are integrally cast. The connecting rod 420 is fixedly connected to a side of the support plate 120 facing away from the magnet 110. Spherical seat 210 is provided at a side of the main body 200 adjacent to the magnetic assembly 100. The spherical seat 210 includes a first circular portion 221 and a second circular portion 231. The ball 410 is accommodated in the spherical seat 210 and rotatable in the spherical seat 210. It should be noted that the rotation of the ball 410 in the spherical seat 210 can be a damping rotation to prevent the cellphone from swinging freely after being mounted on the support plate 120. It can be understood that the universal ball head 400 can include two balls 410. The two balls 410 are rotatably connected to the main body 200 and the support plate 120, allowing for rotation between the main body 200 and the universal ball head 400, as well as between the support plate 120 and the universal ball head 400, thereby increasing the flexibility of the cellphone's usage angle.

Figure 4:
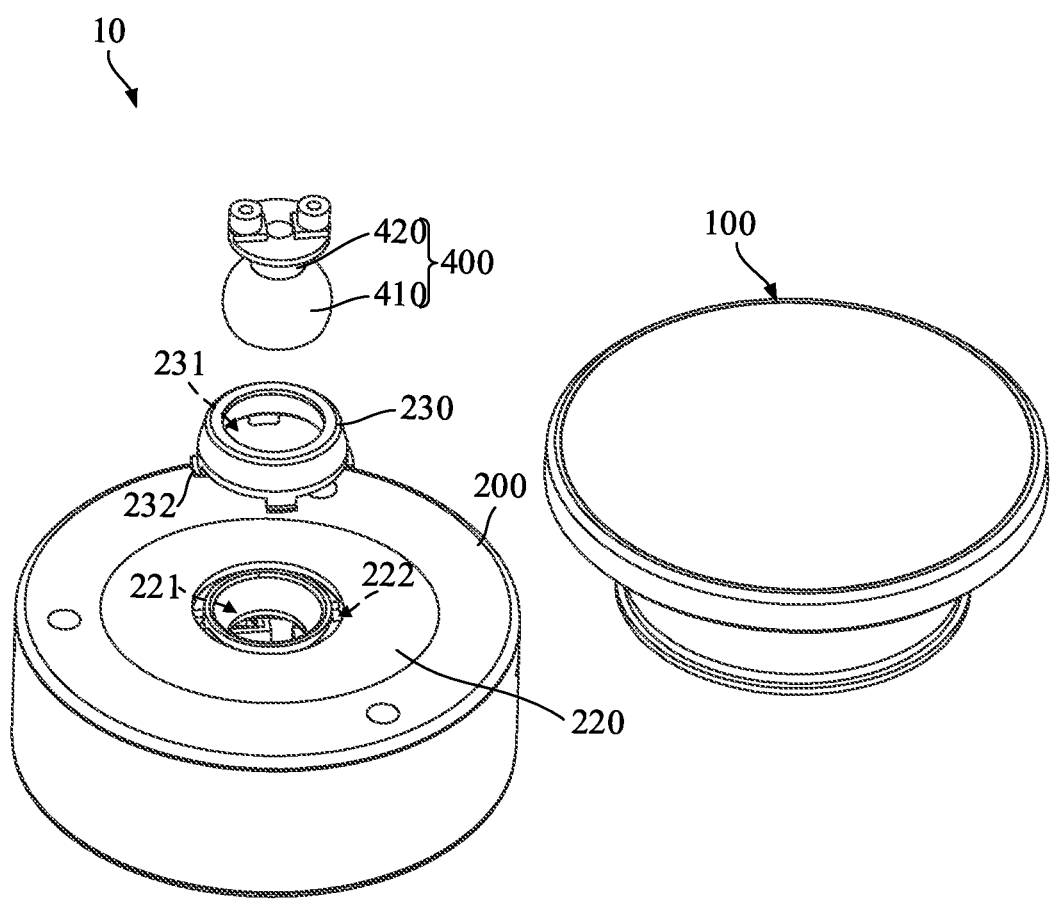
FIG. 4 is a second exploded view of the suction mount shown in FIG. 1.
Figure 5:
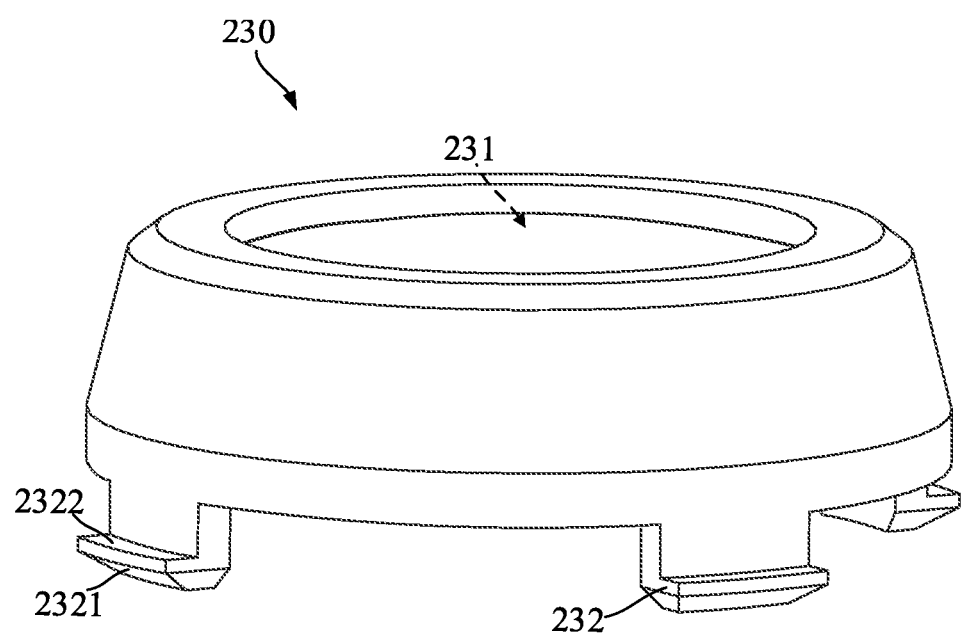
FIG. 5 is a structural diagram of an annular fastener shown in FIG. 4.

As shown in FIGS. 3 to 5, the main body 200 is provided with upper plate 220 and annular fastener 230. The upper plate 220 is located at a side of the main body 200 adjacent to the support plate 120. As depicted in FIG. 4, the upper plate 220 includes an annular recess surrounding the first circular portion 221. The second circular portion 231 is an interior of the annular fastener 230. A radial distance of the first circular portion 221 gradually decreases in a depth direction towards the suction cup 300, and a radial distance of the second circular portion 231 gradually increases in a depth direction towards the suction cup 300. The annular fastener 230 is fastened to the upper plate 220. The first circular portion 221 and the second circular portion 231 are aligned to form the spherical seat 210. A maximum radial distance of the first circular portion 221 and a maximum radial distance of the second circular portion 231 are both not less than a radial distance of the ball 410. The ball 410 is inserted into the first circular portion 221 and the second circular portion 231. A side of the second circular portion 231 adjacent to the support plate 120 is provided with an opening structure. A partial structure of the ball 410 extends from the opening structure and is connected to the connecting rod 420. The opening structure is configured to avoid the connecting rod 420. A maximum radial distance of the opening structure is smaller than the radial distance of the ball 410 to prevent the ball 410 from detaching from the spherical seat 210 at the opening structure.

Multiple hooks 232 are spaced around an edge of the annular fastener 230. The upper plate 220 is provided with multiple corresponding fixing holes 222 within the annular recess surrounding the first circular portion 221. The hook 232 passes through the fixing hole 222 to engage the annular fastener 230 with the upper plate 220. In the depth direction of the second circular portion 231 and the fixing hole 222, an end of the hook 232 is provided with inclined surface 2321 and clamping surface 2322 that are opposite to each other. The inclined surface 2321 is inclined in the depth direction of the fixing hole 222, and the clamping surface 2322 is perpendicular to the depth direction of the fixing hole 222. When the annular fastener 230 is fastened with the upper plate 220, under external force, an outer opening edge of the fixing hole 222 slides relative to the inclined surface 2321. Meanwhile, the outer opening edge of the fixing hole 222 presses the inclined surface 2321, causing the hook 232 to deform and contract towards a center of the annular fastener 230. When the annular fastener 230 is further pushed, the inclined surface 2321 slides over the fixing hole 222, and the hook 232 returns from the deformation. At this point, the clamping surface 2322 abuts against an edge of an inner opening of the fixing hole 222, such that the annular fastener 230 is limited in the depth direction of the fixing hole 222. In this way, the annular fastener 230 is fastened to the upper plate 220.

Figure 6:
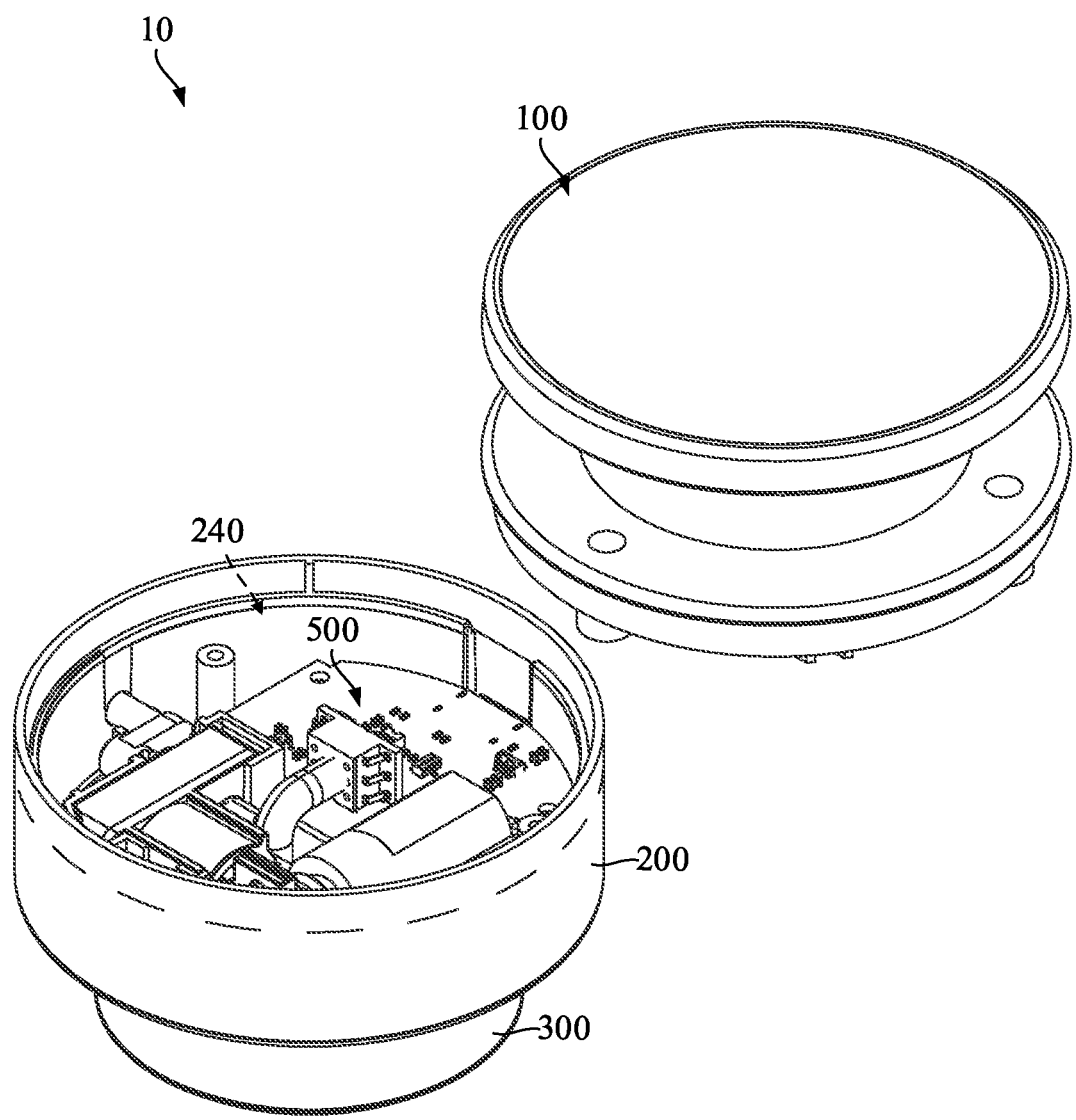
FIG. 6 is a third exploded view of the suction mount shown in FIG. 1.

In an embodiment, as shown in FIG. 6, the suction cup 300 is automatically adhered to the external support plane after being attached to the external support plane. Specifically, the suction mount 10 further includes control assembly 500. The main body 200 is provided with mounting chamber 240. The control assembly 500 is fixed inside the mounting chamber 240. The control assembly 500 is configured to automatically attach the suction cup 300 to the external support plane and continuously monitor a suction pressure. In this way, when the suction mount 10 is in use, the suction cup 300 is convenient to suck with a strong suction effect, thereby avoiding accidental detachment of the suction mount 10 during use.

Figure 7:
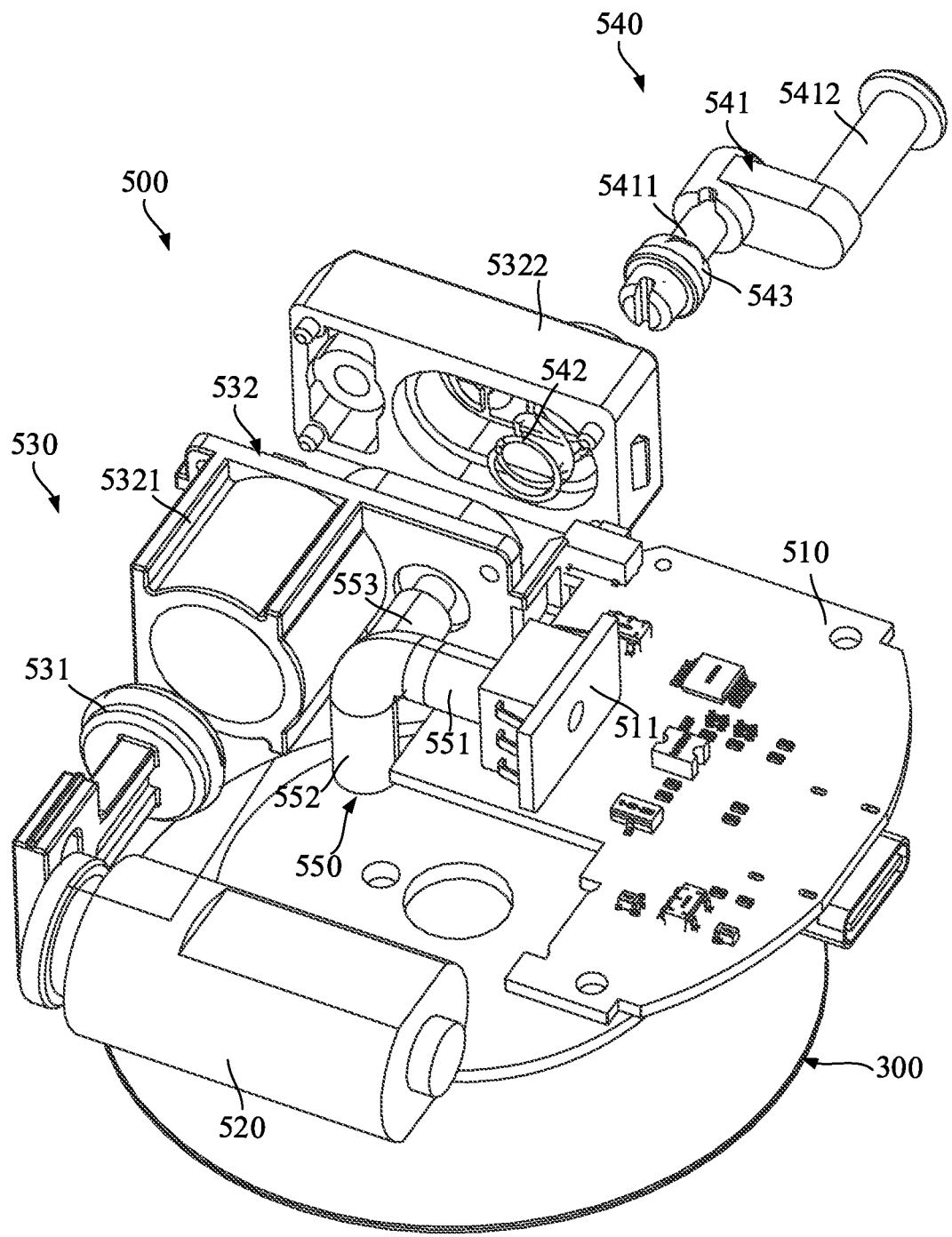
FIG. 7 is an exploded view of a control assembly shown in FIG. 6.
Figure 8:
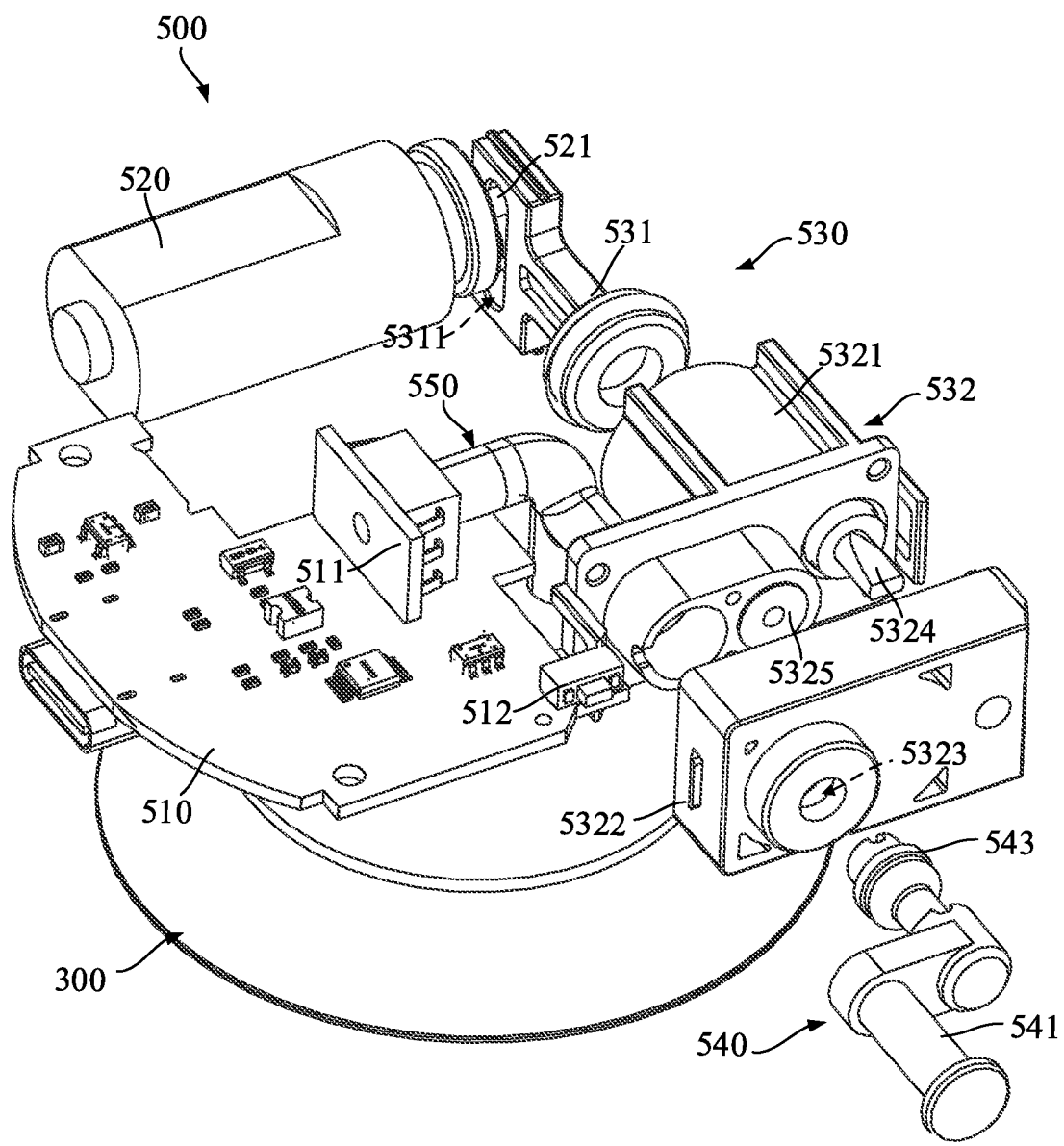
FIG. 8 is an exploded view of the control assembly shown in FIG. 7 from another perspective.

As shown in FIGS. 7 and 8, the control assembly 500 includes motherboard 510, motor 520, and exhaust element 530. The motherboard 510 is fixed in the mounting chamber 240. The motor 520 is electrically connected to the motherboard 510. The motherboard 510 is configured to send an electrical signal to control the start or stop of the motor 520. The motherboard 510 is provided with air pressure detection element 511. The air pressure detection element 511 is communicated with the closed chamber 310 and configured to detect a real-time air pressure value of the closed chamber 310. When the air pressure detection element 511 detects that the pressure value of the closed chamber 310 is higher than a preset value of the air pressure detection element 511, an electrical signal is sent by the air pressure detection element 511 and transmitted to the motor 520 through the motherboard 510 to control the motor 520 to start. The motor 520 is configured to drive the exhaust element 530 to exhaust air in the closed chamber 310. The exhaust element 530 includes piston 531 and cylinder 532. The motor 520 drives the piston 531 to be pulled and extract air inside the cylinder 532. The cylinder 532 is communicated with the closed chamber 310 to reduce the air pressure value of the closed chamber 310. The external atmospheric pressure compresses the suction cup 300 to the external support plane, thereby causing the suction cup 300 to adhere to the external support plane. When the air pressure in the closed chamber 310 is lower than the preset value of the air pressure detection element 511, the suction cup 300 is tightly adhered to the external support plane. At this point, the air pressure detection element 511 sends an electrical signal to the motor 520 so as to control the motor 520 to stop. It can be understood that the preset pressure value of the air pressure detection element 511 is not greater than the value of the external atmospheric pressure.

It should be noted that the working principle of the air pressure detection element 511 is as follows. Usually, a medium pressure directly acts on a diaphragm of a sensor, causing the diaphragm to produce a micro displacement proportional to the medium pressure, which will change the internal resistance of the sensor. The displacement is converted into a standard signal corresponding to the pressure through an electronic circuit. The air pressure detection element 511 is particularly suitable for measuring a pressure value that is greater than the preset pressure value. During the suction phase, it is observed whether the signal output by the air pressure detection element 511 rapidly drops to a preset negative pressure range and remains stable, in order to determine whether the suction cup 300 is successfully adhered to the support plane. After the adhesion state is maintained for a period of time, it is observed whether the signal output by the air pressure detection element 511 changes. If the signal suddenly rises, it indicates that there may be a leak in the enclosed space of suction cup 300. If a leak is detected, the severity of the leak is determined based on the degree and speed of the leak, and a corresponding measure is taken to repair or replace the suction cup 300. The working principle of the air pressure detection element 511 is not limited herein, as long as the air pressure detection element 511 can detect the air pressure in the closed chamber 310 and generate an electrical signal to enable the motor 520 to control the exhaust element 530 to exhaust.

The motor 520 drives the piston 531 to be pulled inside the cylinder 532, causing the air inside the cylinder 532 to be exhausted. An end edge of the motor 520 is fixedly provided with lever 521. When the motor 520 is started, the lever 521 is driven to rotate in a circumferential direction around a central shaft of the motor 520. An end of the piston 531 adjacent to the motor 520 is provided with driving hole 5311. The driving hole 5311 extends in a direction perpendicular to a pull direction of the piston 531. The lever 521 is inserted into the driving hole 5311, such that the lever 521 is limited relative to the piston 531 in the direction perpendicular to the pull direction of the piston 531. When the motor 520 starts, the motor 520 drives the lever 521 to rotate in a circumferential direction along a circular trajectory. When the lever 521 rotates in the circumferential direction, it pulls the piston 531 to move inside the cylinder 532. The lever 521 moves in the driving hole 5311 in the direction perpendicular to the pull direction. The rotation of the lever 521 in the circumferential direction can be decomposed into movement in the pull direction of the piston 531 and movement perpendicular to the pull direction of the piston 531. Thus, the lever 521 drives the piston 531 to move in the pull direction and moves in the direction perpendicular to the pull direction in the driving hole 5311.

The control assembly 500 further includes release button 540. The release button 540 allows external air to enter the enclosed space, in order to detach the suction cup 300 from the support plane. The cylinder 532 includes pull cylinder 5321 and buffer cylinder 5322. The pull cylinder 5321 and the buffer cylinder 5322 are communicated through a hole-shaped structure. The piston 531 moves in the pull cylinder 5321. The other side of the buffer cylinder 5322 is communicated with the closed chamber 310. The air inside the closed chamber 310 reaches the pull cylinder 5321 through the buffer cylinder 5322. When the piston 531 is pulled, the air inside the closed chamber 310 is exhausted. The release button 540 includes pull bolt 541 and elastic element 542. One end of the pull bolt 541 penetrates a wall of the mounting chamber 240 for the user to press. The buffer cylinder 5322 is provided with release hole 5323 for the other end of the pull bolt 541 to pass through. The elastic element 542 abuts against the pull bolt 541 and an inner wall of the buffer cylinder 5322, respectively. The elastic element 542 pushes the pull bolt 541 to close the release hole 5323, so as to maintain a sealed state inside the buffer cylinder 5322. An end of the pull bolt 541 is provided with a flange structure that matches the release hole 5323. Leather ring 543 is sleeved on the flange structure. When the elastic element 542 pushes the end of the pull bolt 541 to block the release hole 5323, the leather ring 543 fills a gap between the pull bolt 541 and an inner wall of the release hole 5323. When it is necessary to detach the suction cup 300 from the support plane, the pull bolt 541 is pressed. The release hole 5323 is opened, and the leather ring 543 is detached from the release hole 5323. The external air enters the buffer cylinder 5322 through the release hole 5323 and enters the closed chamber 310 through the buffer cylinder 5322. In this way, the air pressure in the closed chamber 310 is balanced with the external air pressure, and the suction cup 300 is detached from the external support plane.

The pull cylinder 5321 is provided with first one-way air valve 5324 and second one-way air valve 5325. The first one-way air valve 5324 is configured to connect air inside and outside an inside space of the pull cylinder 5321. The second one-way air valve 5325 is configured to connect the inside space of the pull cylinder 5321 and an inside space of the buffer cylinder 5322. The air inside the pull cylinder 5321 is discharged to the outside through the first one-way air valve 5324. The first one-way gas valve 5324 allows the air to flow from the inside space of the pull cylinder 5321 to the outside, while blocking the external air from entering the inside space of the pull cylinder 5321. The second one-way air valve 5325 allows the air to enter the pull cylinder 5321 through the buffer cylinder 5322, while blocking the air inside the pull cylinder 5321 from entering the buffer cylinder 5322. In this way, when the piston 531 is pulled inside the pull cylinder 5321, the air only enters the pull cylinder 5321 from the buffer cylinder 5322 through the second one-way air valve 5325. When the piston 531 is pushed in the opposite direction, the air is discharged from the pull cylinder 5321 to the outside through the first one-way air valve 5324. Therefore, the pull cylinder 5321 can extract the air from the closed chamber 310 without pushing air into the closed chamber 310. It should be noted that the structure of the one-way air valve is a prior art and will not be further explained herein.

As shown in FIGS. 7 and 8, the control assembly 500 further includes ventilation tube 550. The ventilation tube 550 is configured for ventilation. The ventilation tube 550 includes first tube 551, second tube 552, and third tube 553 that are communicated with each other. The first tube 551 includes one end communicated with the air pressure detection element 511 and the other end communicated with the second tube 552 and the third tube 553. The second tube 552 includes one end communicated with the closed chamber 310 and the other end communicated with the first tube 551 and the third tube 553. The third tube 553 includes one end communicated with the buffer cylinder 5322 and the other end communicated with the first tube 551 and the second tube 552. The air pressure detection element 511 simultaneously detects the pressure values of the closed chamber 310 and the buffer cylinder 5322. The pressure value of the closed chamber 310 is the same as the pressure value of the buffer cylinder 5322 in real time, such that the air pressure detection element 511 can detect the air pressure in real time during the pulling process of the piston 531.

The motherboard 510 is further provided with detection switch 512. The detection switch 512 is configured to control the start or stop of the air pressure detection element 511. When the suction mount 10 is not in use, the detection switch 512 stops the air pressure detection element 511 to prevent false detection of the air pressure detection element 511 and control the motor 520 to continue working. The pull bolt 541 includes first section 5411 and second section 5412 that are connected to each other. The first section 5411 is inserted into the release hole 5323, and the second section 5412 is provided for the user to press. In this embodiment, the second section 5412 is connected to the first section 5411 through a connecting structure. The second section 5412 is not on a same straight line as the first section 5411. The detection switch 512 is located on a pressing movement path of the second section 5412. When the second section 5412 is pressed, the second section 5412 triggers the detection switch 512, and the detection switch 512 stops the air pressure detection element 511. Meanwhile, the first section 5411 opens the release hole 5323. The air enters the closed chamber 310 through the buffer cylinder to separate the suction cup 300 from the external support plane. When the suction mount 10 is in use, the second section 5412 is pressed, and the detection switch 512 starts the air pressure detection element 511. After the external force is removed, the release hole 5323 is closed by the first section 5411. At this point, the air pressure detection element 511 is started to detect the pressure in the closed chamber 310 so as to control the operation of the motor 520.

The foregoing are merely preferred embodiments of the present disclosure, and the scope of the present disclosure is not limited thereto. Any equivalent change made based on the content of the specification and drawings under the inventive concept of the present disclosure or direct/indirect application thereof in other related technical fields should fall within the protection scope of the present disclosure.

The invention claimed is:

1. A suction mount, comprising:
  a magnetic assembly, comprising a magnet and configured to magnetically fix a cellphone through the magnet;
  a main body, provided with a mounting chamber and rotatably connected to the magnetic assembly, wherein a universal ball head is provided between the main body and the magnetic assembly; the universal ball head is connected to the main body and the magnetic assembly, respectively; and at least one of the main body and the magnetic assembly is rotatable relative to the universal ball head, such that the magnetic assembly rotates in any direction relative to the main body;
  a suction cup, located at a side of the main body facing away from the magnetic assembly, wherein the suction cup is configured to be attached to an external support plane to form a closed chamber, and the suction cup is configured to be automatically adhered to the external support plane; and
  a control assembly, located in the mounting chamber and comprising a motherboard, a motor, and an exhaust element, wherein the motor is electrically connected to the motherboard; the exhaust element comprises a piston and a cylinder; and the motor is configured to drive the piston to be pulled inside the cylinder so as to exhaust air in the closed chamber, such that the suction cup is adhered to the external support plane, wherein the universal ball head comprises a ball and a connecting rod; the ball is fixedly connected to the connecting rod; the connecting rod is fixedly connected to the magnetic assembly; a spherical seat is provided at a side of the main body adjacent to the magnetic assembly; and the ball is accommodated in the spherical seat and rotatable in the spherical seat, wherein the main body is provided with an upper plate comprising a first circular portion, and with an annular fastener comprising a second circular portion; the upper plate includes an annular recess surrounding the first circular portion; the second circular portion being an interior of the annular fastener; a radial distance of the first circular portion gradually decreases in a depth direction towards the suction cup, and a radial distance of the second circular portion gradually increases in a depth direction towards the suction cup; the annular fastener is fastened to the upper plate; and the first circular portion and the second circular portion are aligned to form the spherical seat.

2. The suction mount according to claim 1, wherein an edge of the annular fastener is provided with a hook; the annular recess of the upper plate is provided with a fixing hole; an end of the hook is provided with an inclined surface and a clamping surface, wherein the inclined surface and the clamping surface are opposite to each other; the inclined surface is inclined in a depth direction of the fixing hole; the hook is inserted through the fixing hole; when a wall edge of the fixing hole slides along the inclined surface and presses the inclined surface, the hook deforms; and the inclined surface slides over the fixing hole, and the clamping surface is clamped to an edge of the fixing hole, such that the annular fastener is fastened to the upper plate.

3. The suction mount according to claim 1, wherein the magnetic assembly further comprises a cellphone support plate; the cellphone support plate is configured to support the cellphone; a side of the cellphone support plate adjacent to the main body is fixedly connected to the connecting rod; the cellphone support plate is provided with a receiving groove; and the receiving groove is configured to accommodate the magnet.

4. The suction mount according to claim 1, wherein the magnetic assembly further comprises a cover plate; the cover plate is disposed on a side of the cellphone support plate facing away from the main body; and the cover plate closes the receiving groove.

5. The suction mount according to claim 3, wherein the cellphone support plate is provided with a mounting hole; and an end of the connecting rod adjacent to the cellphone support plate is inserted through the mounting hole and fixedly connected to the cellphone support plate, thereby limiting the connecting rod relative to the cellphone support plate.

6. The suction mount according to claim 1, wherein the motherboard is provided with an air pressure detection element; the air pressure detection element is communicated with the closed chamber and configured to detect a pressure value of the closed chamber; and when the pressure value of the closed chamber is higher than a preset value of the air pressure detection element, an electrical signal is sent by the air pressure detection element and controls the motor to start through the motherboard.

7. The suction mount according to claim 1, wherein an end of the motor is provided with a lever; the lever is driven by the motor to rotate in a circumferential direction around a central shaft of the motor; an end of the piston adjacent to the motor is provided with a driving hole, wherein the driving hole extends in a direction perpendicular to a pull direction; the lever is inserted into the driving hole; when the motor drives the lever to rotate, the lever pulls the piston to move inside the cylinder, and the lever moves in the driving hole in the direction perpendicular to the pull direction.

8. The suction mount according to claim 6, wherein the control assembly further comprises a release button; the cylinder comprises a pull cylinder and a buffer cylinder, wherein the pull cylinder and the buffer cylinder are communicated with each other; the piston is pulled in the pull cylinder; the buffer cylinder is communicated with the closed chamber; the release button comprises a pull bolt and an elastic element; an end of the pull bolt penetrates a wall of the mounting chamber; the buffer cylinder is provided with a release hole for the pull bolt to pass through; the elastic element abuts against the pull bolt and an inner wall of the buffer cylinder, respectively; the elastic element pushes the pull bolt to close the release hole; and when the pull bolt is pressed, the release hole is opened, allowing air to enter the closed chamber through the release hole.

9. A suction mount, comprising:

a magnetic assembly, comprising a magnet and configured to magnetically fix a cellphone through the magnet;

a main body, provided with a mounting chamber and rotatably connected to the magnetic assembly, wherein a universal ball head is provided between the main body and the magnetic assembly; the universal ball head is connected to the main body and the magnetic assembly, respectively; and at least one of the main body and the magnetic assembly is rotatable relative to the universal ball head, such that the magnetic assembly rotates in any direction relative to the main body;

a suction cup, located at a side of the main body facing away from the magnetic assembly, wherein the suction cup is configured to be attached to an external support plane to form a closed chamber, and the suction cup is configured to be automatically adhered to the external support plane; and a control assembly, located in the mounting chamber and comprising a motherboard, a motor, and an exhaust element, wherein the motor is electrically connected to the motherboard; the exhaust element comprises a piston and a cylinder; and the motor is configured to drive the piston to be pulled inside the cylinder so as to exhaust air in the closed chamber, such that the suction cup is adhered to the external support plane, wherein the motherboard is provided with an air pressure detection element; the air pressure detection element is communicated with the closed chamber and configured to detect a pressure value of the closed chamber; and when the pressure value of the closed chamber is higher than a preset value of the air pressure detection element, an electrical signal is sent by the air pressure detection element and controls the motor to start through the motherboard, wherein the control assembly further comprises a release button; the cylinder comprises a pull cylinder and a buffer cylinder, wherein the pull cylinder and the buffer cylinder are communicated with each other; the piston is pulled in the pull cylinder; the buffer cylinder is communicated with the closed chamber; the release button comprises a pull bolt and an elastic element; an end of the pull bolt penetrates a wall of the mounting chamber; the buffer cylinder is provided with a release hole for the pull bolt to pass through; the elastic element abuts against the pull bolt and an inner wall of the buffer cylinder, respectively; the elastic element pushes the pull bolt to close the release hole; and when the pull bolt is pressed, the release hole is opened, allowing air to enter the closed chamber through the release hole, and wherein the release button further comprises a leather ring; the leather ring is sleeved outside an end of the pull bolt adjacent to the release hole; and when the pull bolt closes the release hole, the leather ring fills a gap between the pull bolt and a wall of the release hole.

10. A suction mount, comprising:

a magnetic assembly, comprising a magnet and configured to magnetically fix a cellphone through the magnet;

a main body, provided with a mounting chamber and rotatably connected to the magnetic assembly, wherein a universal ball head is provided between the main body and the magnetic assembly; the universal ball head is connected to the main body and the magnetic assembly, respectively; and at least one of the main body and the magnetic assembly is rotatable relative to the universal ball head, such that the magnetic assembly rotates in any direction relative to the main body;

a suction cup, located at a side of the main body facing away from the magnetic assembly, wherein the suction cup is configured to be attached to an external support plane to form a closed chamber, and the suction cup is configured to be automatically adhered to the external support plane; and a control assembly, located in the mounting chamber and comprising a motherboard, a motor, and an exhaust element, wherein the motor is electrically connected to the motherboard; the exhaust element comprises a piston and a cylinder; and the motor is configured to drive the piston to be pulled inside the cylinder so as to exhaust air in the closed chamber, such that the suction cup is adhered to the external support plane, wherein the motherboard is provided with an air pressure detection element; the air pressure detection element is communicated with the closed chamber and configured to detect a pressure value of the closed chamber; and when the pressure value of the closed chamber is higher than a preset value of the air pressure detection element, an electrical signal is sent by the air pressure detection element and controls the motor to start through the motherboard, wherein the control assembly further comprises a release button; the cylinder comprises a pull cylinder and a buffer cylinder, wherein the pull cylinder and the buffer cylinder are communicated with each other; the piston is pulled in the pull cylinder; the buffer cylinder is communicated with the closed chamber; the release button comprises a pull bolt and an elastic element; an end of the pull bolt penetrates a wall of the mounting chamber; the buffer cylinder is provided with a release hole for the pull bolt to pass through; the elastic element abuts against the pull bolt and an inner wall of the buffer cylinder, respectively; the elastic element pushes the pull bolt to close the release hole; and when the pull bolt is pressed, the release hole is opened, allowing air to enter the closed chamber through the release hole, and wherein the pull cylinder is provided with a first one-way air valve and a second one-way air valve; the first one-way air valve connects an inside space of the pull cylinder and an outside space; the second one-way air valve communicates the pull cylinder with the buffer cylinder; an air flow direction of the first one-way air valve is from the inside space of the pull cylinder to the outside space; and an air flow direction of the second one-way air valve is from an inside space of the buffer cylinder to the inside space of the pull cylinder.

11. A suction mount, comprising:

a magnetic assembly, comprising a magnet and configured to magnetically fix a cellphone through the magnet;

a main body, provided with a mounting chamber and rotatably connected to the magnetic assembly, wherein a universal ball head is provided between the main body and the magnetic assembly; the universal ball head is connected to the main body and the magnetic assembly, respectively; and at least one of the main body and the magnetic assembly is rotatable relative to the universal ball head, such that the magnetic assembly rotates in any direction relative to the main body;

a suction cup, located at a side of the main body facing away from the magnetic assembly, wherein the suction cup is configured to be attached to an external support plane to form a closed chamber, and the suction cup is configured to be automatically adhered to the external support plane; and a control assembly, located in the mounting chamber and comprising a motherboard, a motor, and an exhaust element, wherein the motor is electrically connected to the motherboard; the exhaust element comprises a piston and a cylinder; and the motor is configured to drive the piston to be pulled inside the cylinder so as to exhaust air in the closed chamber, such that the suction cup is adhered to the external support plane, wherein the motherboard is provided with an air pressure detection element; the air pressure detection element is communicated with the closed chamber and configured to detect a pressure value of the closed chamber; and when the pressure value of the closed chamber is higher than a preset value of the air pressure detection element, an electrical signal is sent by the air pressure detection element and controls the motor to start through the motherboard, wherein the control assembly further comprises a release button; the cylinder comprises a pull cylinder and a buffer cylinder, wherein the pull cylinder and the buffer cylinder are communicated with each other; the piston is pulled in the pull cylinder; the buffer cylinder is communicated with the closed chamber; the release button comprises a pull bolt and an elastic element; an end of the pull bolt penetrates a wall of the mounting chamber; the buffer cylinder is provided with a release hole for the pull bolt to pass through; the elastic element abuts against the pull bolt and an inner wall of the buffer cylinder, respectively; the elastic element pushes the pull bolt to close the release hole; and when the pull bolt is pressed, the release hole is opened, allowing air to enter the closed chamber through the release hole, and wherein the control assembly further comprises a ventilation tube; the ventilation tube comprises a first tube, a second tube and a third tube, wherein the first tube, the second tube and the third tube are communicated with each other; the first tube is communicated with the air pressure detection element; the second tube is communicated with the closed chamber; the third tube is connected to the buffer cylinder; and the air pressure detection element simultaneously detects the pressure value of the closed chamber and a pressure value of the buffer cylinder.

12. A suction mount, comprising:

a magnetic assembly, comprising a magnet and configured to magnetically fix a cellphone through the magnet;

a main body, provided with a mounting chamber and rotatably connected to the magnetic assembly, wherein a universal ball head is provided between the main body and the magnetic assembly; the universal ball head is connected to the main body and the magnetic assembly, respectively; and at least one of the main body and the magnetic assembly is rotatable relative to the universal ball head, such that the magnetic assembly rotates in any direction relative to the main body;

a suction cup, located at a side of the main body facing away from the magnetic assembly, wherein the suction cup is configured to be attached to an external support plane to form a closed chamber, and the suction cup is configured to be automatically adhered to the external support plane; and a control assembly, located in the mounting chamber and comprising a motherboard, a motor, and an exhaust element, wherein the motor is electrically connected to the motherboard; the exhaust element comprises a piston and a cylinder; and the motor is configured to drive the piston to be pulled inside the cylinder so as to exhaust air in the closed chamber, such that the suction cup is adhered to the external support plane, wherein the motherboard is provided with an air pressure detection element: the air pressure detection element is communicated with the closed chamber and configured to detect a pressure value of the closed chamber; and when the pressure value of the closed chamber is higher than a preset value of the air pressure detection element, an electrical signal is sent by the air pressure detection element and controls the motor to start through the motherboard, wherein the control assembly further comprises a release button; the cylinder comprises a pull cylinder and a buffer cylinder, wherein the pull cylinder and the buffer cylinder are communicated with each other: the piston is pulled in the pull cylinder; the buffer cylinder is communicated with the closed chamber: the release button comprises a pull bolt and an elastic element; an end of the pull bolt penetrates a wall of the mounting chamber; the buffer cylinder is provided with a release hole for the pull bolt to pass through; the elastic element abuts against the pull bolt and an inner wall of the buffer cylinder, respectively; the elastic element pushes the pull bolt to close the release hole; and when the pull bolt is pressed, the release hole is opened, allowing air to enter the closed chamber through the release hole, and wherein the motherboard is provided with a detection switch; the detection switch is configured to control a start or stop of the air pressure detection element; the pull bolt comprises a first section and a second section, wherein the first section and the second section are connected to each other; the first section is inserted into the release hole; the second section is provided for external pressing; the detection switch is located on a pressing path of the second section; and when the second section is pressed, the detection switch is triggered.

* * * * *